(12) United States Patent
Thomae et al.

(10) Patent No.: US 7,188,827 B2
(45) Date of Patent: Mar. 13, 2007

(54) GAS SPRING WITH A PROTECTIVE SLEEVE FOR A ROLLING BELLOWS

(75) Inventors: Achim Thomae, Bergrheinfeld (DE); Robert Pradel, Röthlein (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 30 days.

(21) Appl. No.: 11/060,014

(22) Filed: Feb. 17, 2005

(65) Prior Publication Data
US 2005/0179177 A1    Aug. 18, 2005

(30) Foreign Application Priority Data
Feb. 18, 2004   (DE) ...................... 10 2004 007 962

(51) Int. Cl.
*F16F 9/04* (2006.01)
(52) U.S. Cl. .................................... 267/64.21; 267/122
(58) Field of Classification Search ................. 267/35, 267/64.13, 64.16, 64.19, 64.21, 64.23, 64.24, 267/122, 123
See application file for complete search history.

(56) References Cited

U.S. PATENT DOCUMENTS

| | | | |
|---|---|---|---|
| 4,712,776 A * | 12/1987 | Geno et al. .............. | 267/64.21 |
| 4,817,922 A | 4/1989 | Hovance | |
| 4,902,903 A * | 2/1990 | Segerson et al. ....... | 250/559.29 |
| 4,930,340 A | 6/1990 | Evans | |
| 4,989,844 A * | 2/1991 | Wijnhoven et al. ...... | 267/64.24 |
| 5,009,401 A | 4/1991 | Weitzenhof | |
| 5,707,045 A * | 1/1998 | Easter ..................... | 267/64.21 |
| 5,859,692 A * | 1/1999 | Ross et al. ................. | 356/4.01 |
| 6,290,033 B1 * | 9/2001 | Oliver ..................... | 188/267.1 |
| 6,637,254 B2 * | 10/2003 | Wagner et al. ............. | 73/31.05 |

FOREIGN PATENT DOCUMENTS

| | | |
|---|---|---|
| EP | 0 313 501 | 4/1989 |
| EP | 0 318 696 | 6/1989 |
| EP | 0 828 087 | 3/1998 |

OTHER PUBLICATIONS

English translation of a Office Action dated Mar. 17, 2006 for the corresponding Korean Patent Application No. 10-2005-0013253.
French Search Report dated Jul. 1, 2005, issued for FR Application No. 0501675.
AUDI A8, "Audi adaptive air suspension", ATZ 2002, Special Edition Audi A8, p. 86 ff.

* cited by examiner

*Primary Examiner*—Devon Kramer
(74) *Attorney, Agent, or Firm*—Cohen Pontani Lieberman & Pavane LLP

(57) ABSTRACT

Gas spring includes a cover which works together with a rolling bellows and a bottom part to form a gas-filled spring space, where at least part of the outside surface of the rolling bellows is covered by a sleeve. The sleeve provides a receptacle for at least one sensor which detects the stroke position of the gas spring.

20 Claims, 5 Drawing Sheets

GAS SPRING WITH A PROTECTIVE SLEEVE FOR A ROLLING BELLOWS

BACKGROUND OF THE INVENTION

1. Field of the Invention

The invention pertains to a gas spring including a bottom part, a cover, a rolling bellows fixed between the bottom part and the cover to form a gas filled spring space, and a sensor for determining the stroke position.

2. Description of the Related Art

A gas spring in combination with a vibration damper is known from ATZ 2002, Special Edition Audi A8, p. 86 ff. The gas spring comprises a cover, which is attached to the vehicle body and which is connected to the top end of a rolling bellows. A bottom end of the bellows is clamped to a rolldown tube. As can be derived from the report, a comparatively thin-walled bellows is used to minimize the stiffening of the gas spring under high-frequency excitation. A thin-walled bellows, however, is more sensitive to impacts by stones, so that a protective metal sleeve is used, which is also connected to the cover of the gas spring. The gas spring is part of a level control system, in which the level signal is determined by the use of a linkage inside the vehicle axle. The linkage is unavoidably exposed to dirt from the road and must be adjusted carefully to prevent the level from being set incorrectly.

U.S. Pat. No. 5,009,401 discloses a gas spring with a rigid cover, to which a tubular body is connected, which forms part of the spring space of the gas spring. Connected in turn to the tubular body is a rolling bellows, which is also clamped to a rolldown tube. A can-like part is also attached to the tubular body and has the function of supporting and protecting the rolling bellows. A height sensor is mounted in the rigid tubular body and is therefore located in a stationary position with respect to the piston rod; it can therefore be assumed that this is a pressure sensor. Because of its asymmetric profile, the tubular body is a comparatively expensive component.

SUMMARY OF THE INVENTION

The task of the present invention is to create a gas spring which includes a level sensor but which is nevertheless simple in design.

The great advantage consists in that a comparatively simple gas spring design can be retained, because, for example, it is possible to eliminate a complicated tubular body such as that used according to the state of the art cited above.

In an embodiment, the receptacle is designed as a pocket, in which the sensor is mounted. For this purpose, the sleeve can be provided with, for example, a pleat, which can be very easily formed in the sleeve material.

As a further design elaboration, the pocket in the sleeve can be provided with a cover on the side facing the rolling bellows. The sensor is then well protected in its position between the rolling bellows and the sleeve. The cover prevents the rolling bellows from destroying the sensor and also prevents the rolling bellows from expanding toward the pocket and thus from being subjected to excessive stress.

It is also possible to provide a protective bellows, which axially adjoins the sleeve, in which case the sensor will be located between the sleeve and the protective bellows. This possibility allows the use of a sleeve with a very simple profile, because the sleeve forms only a part of the receptacle, whereas the protective bellows covers the larger area of the sensor on the outside.

A sensor holder can also be attached to the sleeve. There are several effective solutions with respect to the ways in which the sensor holder can be attached.

For example, the sensor holder can be designed as an integral part of the sleeve. Alternatively, the sensor holder can be adhesively bonded to the sleeve.

A sensor attached to the sleeve preferably cooperates with a permanent magnet located inside the gas spring, because then the advantage is obtained that there is no need for a connection extending into the spring space. For this purpose, it is provided that the sleeve consists of a magnetically transparent material.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
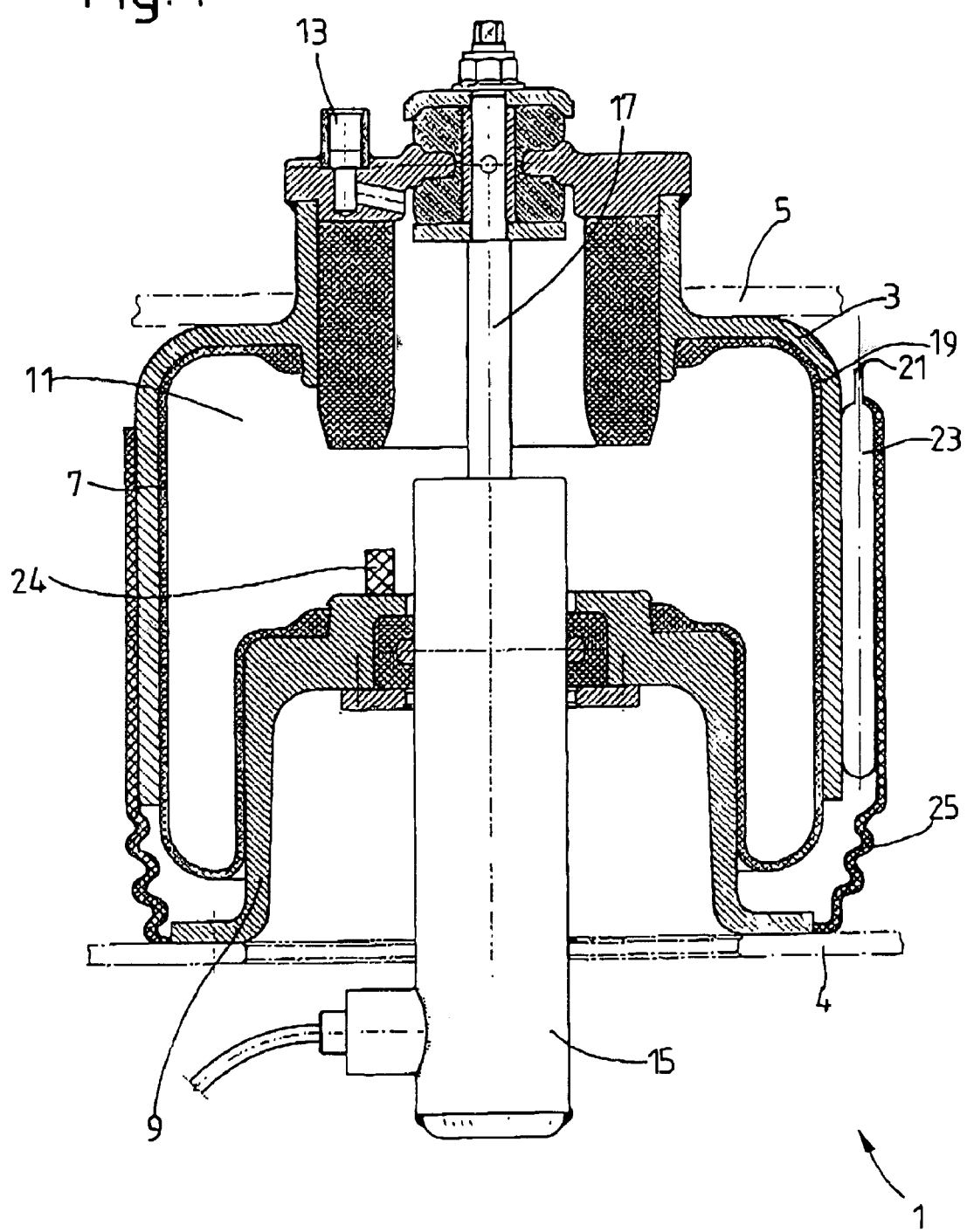
FIG. 1 shows a schematic diagram of the inventive gas spring.

FIG. 1 shows in simplified form a gas spring 1 of the type which is used, for example, between a vehicle axle 4 and a vehicle body 5. The gas spring 1 has a cover 3, which is mounted permanently on the vehicle body 5. The cover works together with a rolling bellows 7 and a bottom part 9, in this case a rolldown tube, to form a gas-filled spring space 11, the volume of which can be changed at will through a connection 13. A vibration damper 15 of any desired design is mounted coaxially with respect to the gas spring; the piston rod 17 of the vibration damper is also attached permanently to the vehicle body.

The rolling bellows 7 should preferably be thin-walled. To protect it against external influences, a sleeve 19 is provided, which is formed as one piece with the cover 3 and covers at least part of the outside surface of the rolling bellows. The sleeve provides a receptacle 21 for a sensor 23, which detects the stroke position of the gas spring. In this embodiment, a protective bellows 25 axially adjoins the sleeve 19, and the sensor 23 is located between the sleeve 19 and the protective bellows 25. The axis of the sensor is parallel to the longitudinal axis of the gas spring, and the protective bellows is designed to overlap the sleeve. As a result, the sensor is very well protected. Depending on the way in which the protective bellows is attached to the sleeve, e.g., by means of a heat-shrink tubing connection, it can be possible to omit any additional means for fastening the sensor to the sleeve.

Figure 2:
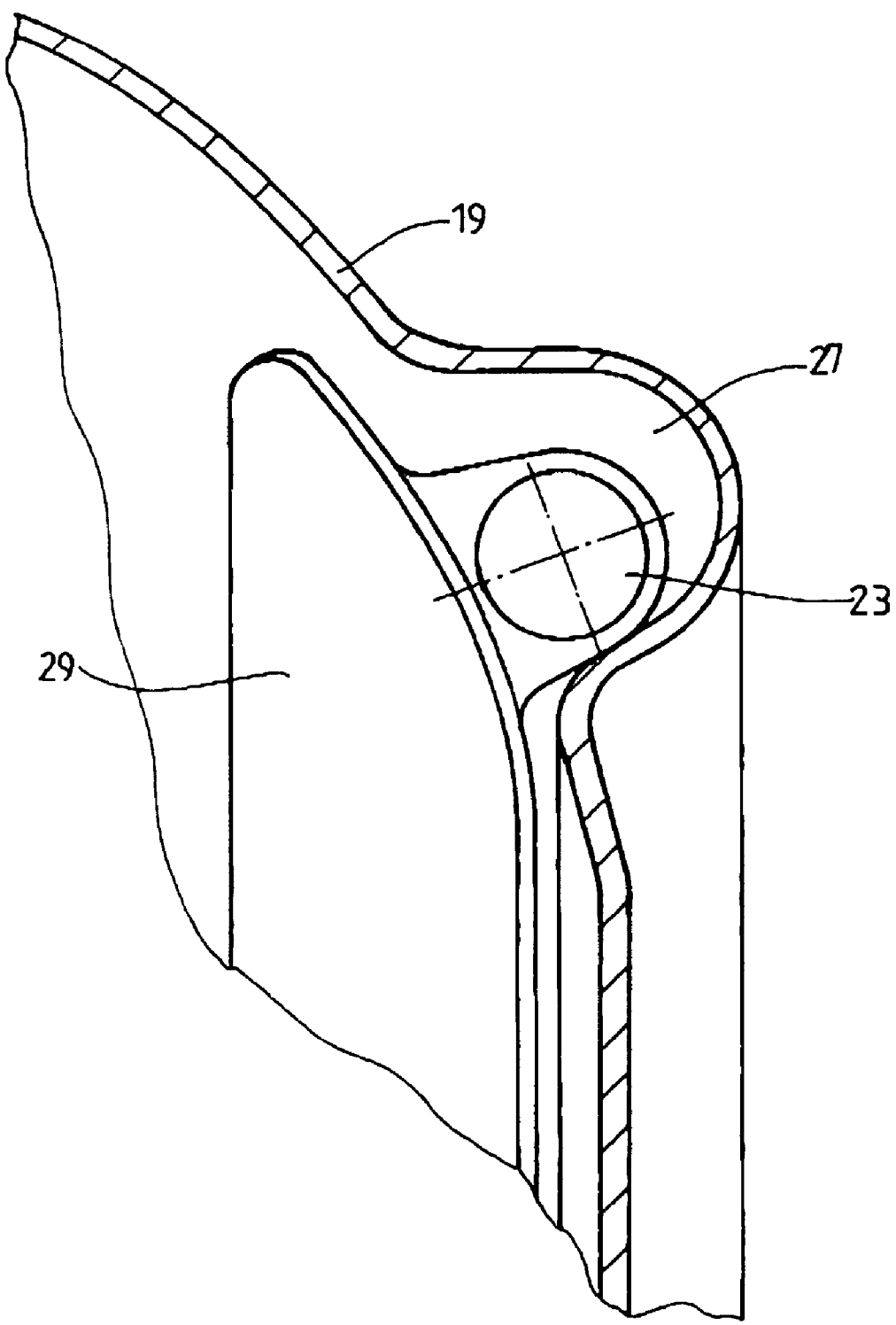
FIG. 2 shows a sensor between the sleeve and the rolling bellows.

FIG. 2 shows a perspective view of a section of an alternative embodiment. The sleeve 19 has a pocket 27 in the form of a radially outward-oriented pleat, in which the sensor 23 is mounted. In the direction facing the rolling bellows 7, the pocket 27 in the sleeve is provided with a cover 29 to protect the sensor from the rolling bellows, i.e., to prevent the bellows from expanding into the pocket.

Figure 3:
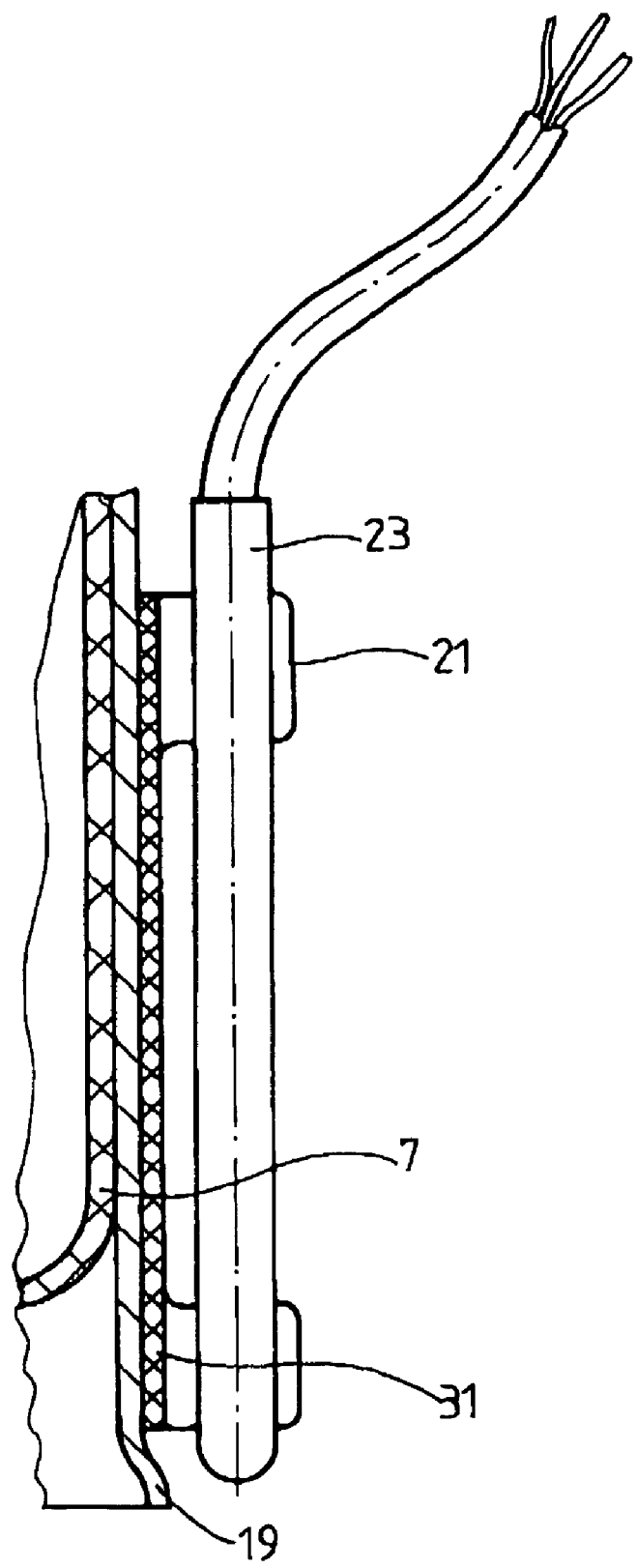
FIG. 3 shows a sensor holder and a sensor on the sleeve.
Figure 4:
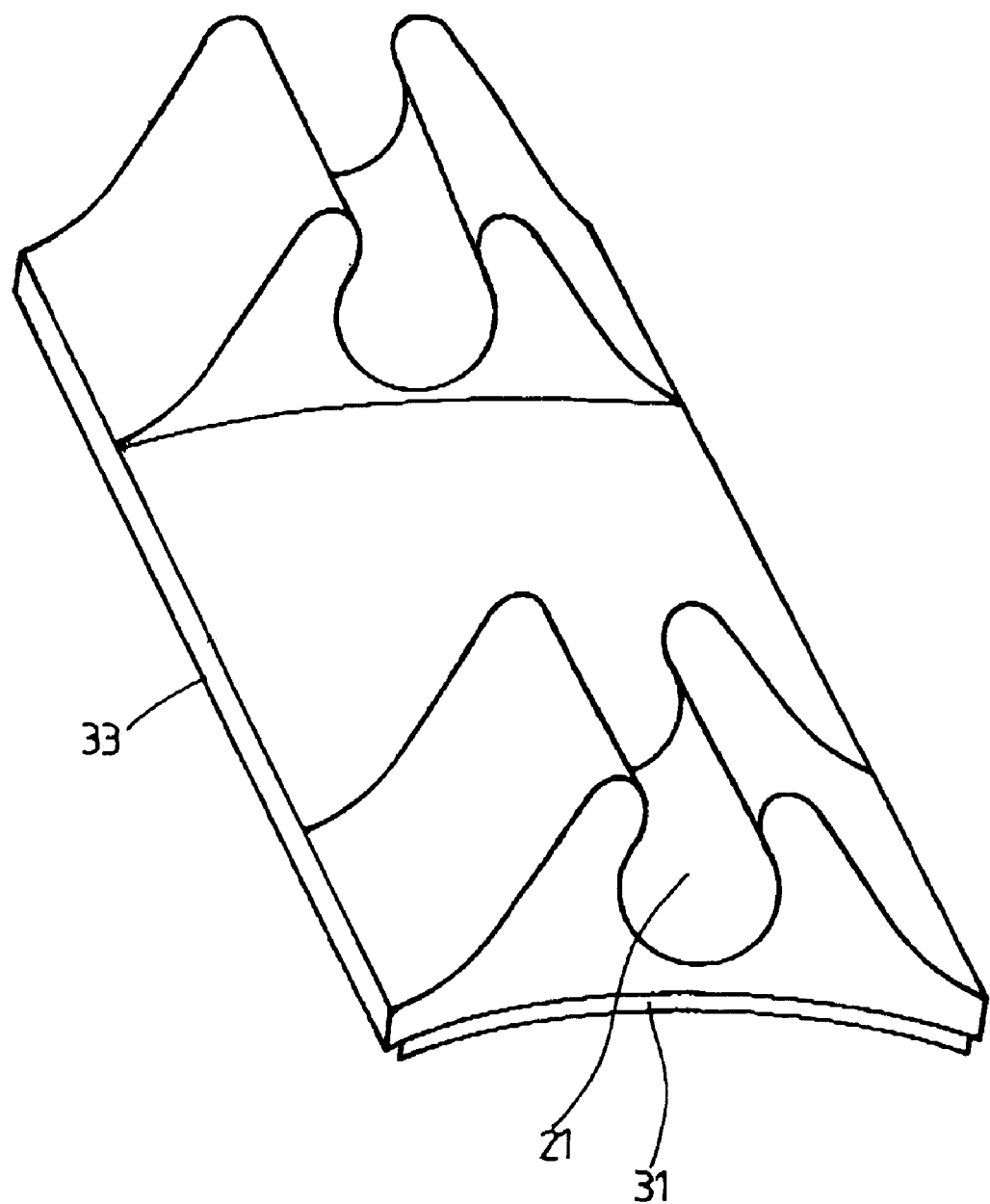
FIG. 4 shows a sensor holder.

Another variant is shown in FIG. 3, which is limited to a diagram of the walls of the rolling bellows 7 and of the sleeve 19 with the receptacle 21 for the sensor 23. The receptacle is formed by a sensor holder, which is attached to the sleeve. The sensor holder is attached, for example, by means of an adhesive pad 31 to the sleeve. FIG. 4 shows the sensor holder as a separate part, which consists of a fastening surface 33 facing the sleeve and at least one receptacle 21 for the cylindrical sensor 23.

The sensor reacts to magnetic fields, which, for example, are generated by a permanent magnet 24 inside the gas spring, which, if desired can be attached either to the vibration damper 15 or to the rolldown tube 9. For this reason, the sleeve 19 and possibly the sensor holder 21 should be made of a magnetically transparent material. The sensor can be a hall effect sensor or a read switch; there can be more than one sensor and more than one holder.

Figure 5:
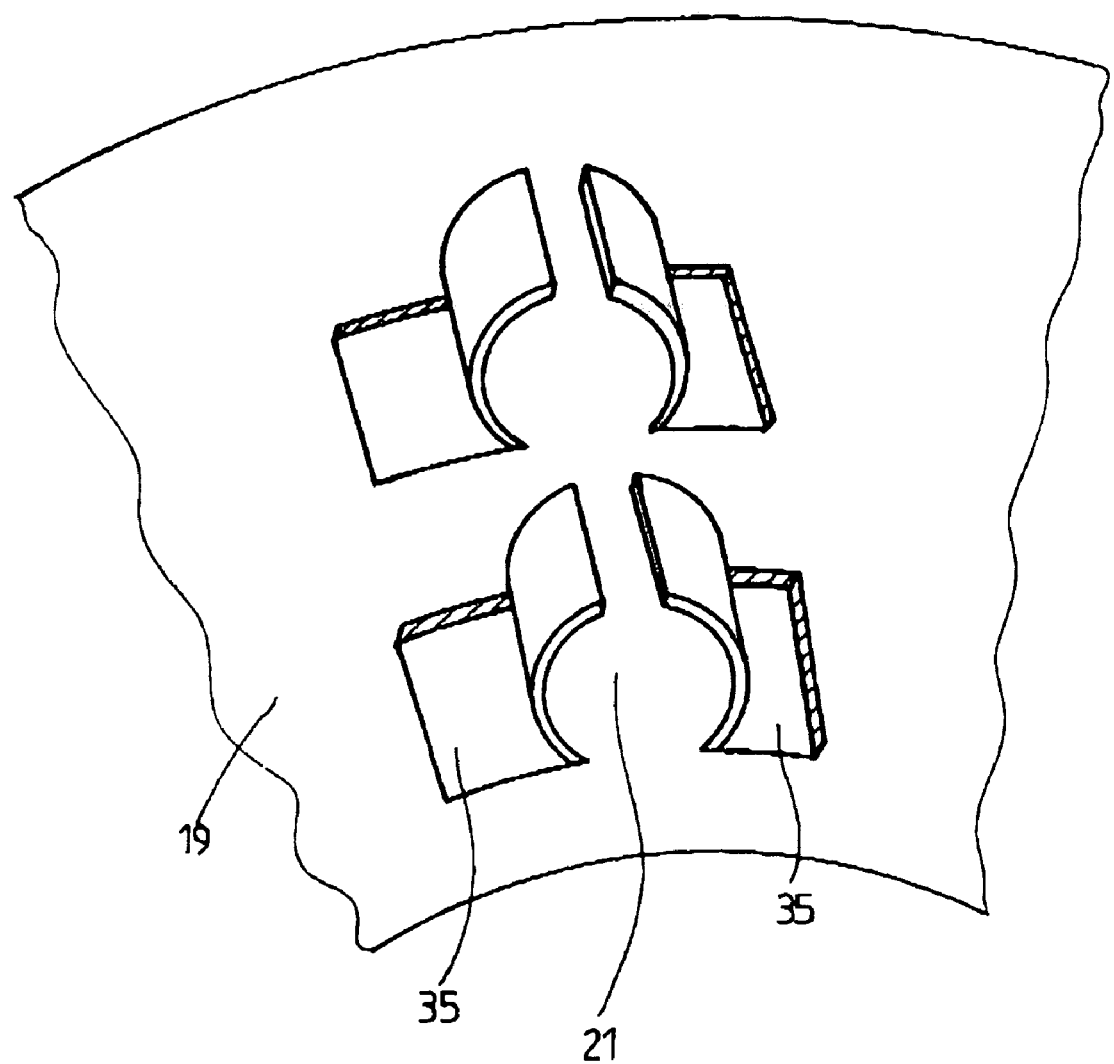
FIG. 5 shows a receptacle formed as an integral part of the sleeve.

FIG. 5 is intended to show that the sensor holder or the receptacle 21 can also be designed as one piece with the sleeve 19. The geometry of FIG. 5 is modeled after the design according to FIG. 4. Of course, care should be taken to ensure that the amount of material cut out of the areas 35 to receive the sensor is not too large, because otherwise the ability of the sleeve 19 to protect the rolling bellows 7 would be jeopardized.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A gas spring comprising:
   a bottom part;
   a cover which is moveable relative to the bottom part;
   a rolling bellows fixed to said bottom part and to said cover to form a gas-filled spring space, said rolling bellows having an outside surface;
   a sleeve covering at least part of said outside surface, said sleeve having a holder for a sensor; and
   a sensor in said holder for determining a stroke position of the gas spring,
   wherein the holder comprises a pocket formed in the sleeve.

2. The gas spring of claim 1, wherein the pocket faces the rolling bellows, the gas spring further comprising a sensor cover located between the pocket and the rolling bellows.

3. The gas spring of claim 1, further comprising a magnet which is fixed with respect to the bottom part, the sensor being a magnetic sensor.

4. A gas spring comprising:
   a bottom part;
   a cover which is moveable relative to the bottom part;
   a rolling bellows fixed to said bottom part and to said cover to form a gas-filled spring space, said rolling bellows having an outside surface;
   a sleeve covering at least part of said outside surface, said sleeve having a holder for a a sensor in said holder for determining a stroke position of the gas spring; and
   a protective bellows surrounding the sleeve, the sensor being located between the sleeve and the protective bellows.

5. The gas spring of claim 4, wherein the holder is attached to the sleeve.

6. The gas spring of claim 5, wherein the holder is adhesively bonded to the sleeve.

7. The gas spring of claim 4, wherein the holder is formed as one piece with the sleeve.

8. The gas spring of claim 4, wherein the sleeve is comprised of a magnetically transparent material.

9. The gas spring of claim 4, wherein the sleeve is fixed to the cover.

10. The gas spring of claim 8, wherein the sensor is a magnetic sensor, the gas spring further comprising a magnet which is fixed with respect to the bottom part.

11. The gas spring of claim 9, wherein the sleeve is formed as one piece with the cover.

12. A gas spring comprising:
    a bottom part;
    a cover which is moveable relative to the bottom part;
    a rolling bellows fixed to said bottom part and to said cover to form a gas-filled spring space, said rolling bellows having an outside surface;
    a sleeve covering at least part of said outside surface, said sleeve having a holder for a sensor;
    a magnet which is fixed with respect the bottom part; and
    a sensor in said holder for determining a stroke position of the gas spring,
    wherein the sleeve is fixed to the cover, and the sensor is a magnetic sensor.

13. The gas spring of claim 12, wherein the holder is attached to the sleeve.

14. The gas spring of claim 13, wherein the holder is adhesively bonded to the sleeve.

15. The gas spring of claim 12, wherein the holder is formed as one piece with the sleeve.

16. A gas spring comprising:
    a bottom part;
    a cover which is moveable relative to the bottom part;
    a rolling bellows fixed to said bottom part and to said cover to form a gas-filled spring space, said rolling bellows having an outside surface;
    a sleeve covering at least part of said outside surface, said sleeve having a holder for a sensor; and
    a sensor in said holder for determining a stroke position of the gas spring,
    wherein the sleeve is formed as one piece with the cover.

17. The gas spring of claim 16, wherein the holder is attached to the sleeve.

18. The gas spring of claim 17, wherein the holder is adhesively bonded to the sleeve.

19. The gas spring of claim 16, wherein the holder is formed as one piece with the sleeve.

20. The gas spring of claim 16, further comprising a magnet which is fixed with respect to the bottom part, the sensor being a magnetic sensor.

* * * * *